United States Patent [19]

McClenny

[11] Patent Number: 4,982,512

[45] Date of Patent: Jan. 8, 1991

[54] VAPOR RECOVERY SYSTEM

[75] Inventor: Ronnie G. McClenny, Northport, Ala.

[73] Assignee: JVC Magnetics America Co., Tuscaloosa, Ala.

[21] Appl. No.: 448,223

[22] Filed: Dec. 11, 1989

[51] Int. Cl.⁵ ............................................. F26B 21/06
[52] U.S. Cl. ........................................ 34/77; 62/50.2; 62/18; 34/27; 34/74; 34/79; 34/80
[58] Field of Search .................... 34/73, 74, 27, 79, 80, 34/77; 62/50.2, 18, 17

[56] References Cited

U.S. PATENT DOCUMENTS

| | | | |
|---|---|---|---|
| 3,714,719 | 2/1973 | Wayne | 34/74 |
| 4,053,990 | 10/1977 | Bielinski | 34/27 |
| 4,150,494 | 4/1979 | Rothchild | 34/28 |
| 4,295,282 | 10/1981 | Fox | 34/27 |
| 4,370,357 | 1/1983 | Swartz | 427/46 |
| 4,466,202 | 8/1984 | Merten | 34/27 |
| 4,469,720 | 9/1984 | Morris | 34/74 |
| 4,475,293 | 10/1984 | Banerjee | 34/27 |

Primary Examiner—Henry A. Bennet
Assistant Examiner—Denise L. F. Gramada
Attorney, Agent, or Firm—Amster, Rothstein & Ebenstein

[57] ABSTRACT

A solvent recovery system comprises a flotation-type coating oven for evaporating solvent from a coating on a film, the oven including a bed of nitrogen vapor for supporting the film and discharging a vapor stream including the nitrogen vapor and the solvent vapor. A vapor phase molecular sieve means dries the vapor stream from the oven and discharges a dried vapor stream. Condensation-type solvent recovery heat exchangers condense the solvent vapor in the dried vapor stream from the sieve and discharge nitrogen vapor and liquid solvent separately. A cryogenic vaporizer converts liquid nitrogen to nitrogen vapor with heat from a heat exchange fluid in heat exchange relationship with the liquid nitrogen. The heat exchange fluid from the vaporizer passes through the solvent recovery heat exchangers in heat exchange relationship with the dried vapor stream therein to cool the same.

10 Claims, 1 Drawing Sheet

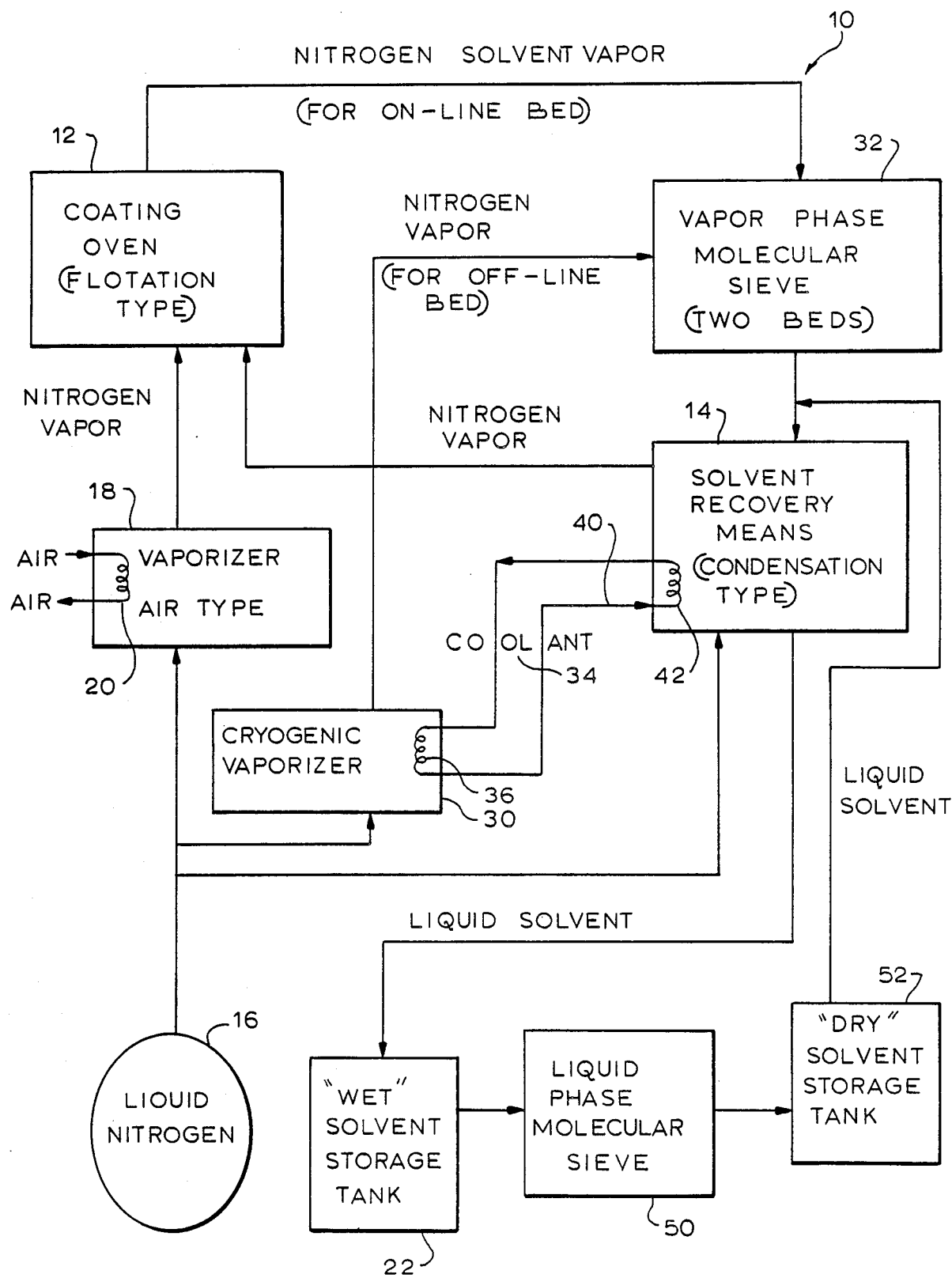

VAPOR RECOVERY SYSTEM

BACKGROUND OF THE INVENTION

The present invention relates to a solvent recovery system and, more particularly, to a solvent recovery system for recovering the organic solvents used during the coating of video tape and like materials.

Various magnetic tapes, such as video tape and audio tape, are manufactured by coating a mixture of metal oxide powder, organic solvent, and binder on a plastic film. The solvent (e.g., a mixture of methyl ethyl detone, toluene, methyl isobutyl ketone is then evaporated in an oven in order to leave a mixture of the metal oxide powder and binder on the surface of the film. Solvent reclamation is a necessity for both economic and environmental reasons.

A preferred oven for the separation of solvent from the binder and iron oxide is a non-contact dryer oven, such as an inert flotation dryer oven. Unlike conventional ovens which use rollers to transport the film, the flotation dryer over allows the film to pass through it without making any physical contact. Such an oven is typically equipped with inlet and outlet isolation curtains for maintaining an inert gas inside the dryer, preferably with a minimal oxygen intrusionn of 4% or less. For reasons of safety and economy, nitrogen is commonly used as the inert gas, and the inert gas will hereinafter be referred to as nitrogen, although it is to be understood that other inert gases may be used in addition to or instead of nitrogen. Because the process utilizes inert gas in the drying oven instead of air, there is less danger of explosion or fire in the oven. As a result, a lower gas velocity may be employed without danger of exceeding the lower explosive limit of the solvent concentration in the vapor stream.

The coated film is pulled by a coating line through the flotation oven, the film being supported on a cushion of nitrogen vapor, typically induced by gas nozzles disposed both below and above the film. The nitrogen vapor pressure of the many gas nozzles spaced above and below the travel path of the film is adjusted to maintain the desired film path. Typically the oven includes several zones, each zone being maintained at a different temperature, to permit a controlled increase in temperature through the oven in the direction of the travel path so that the speed of solvent evaporation is controlled.

A blower, such as a fixed displacement blower, removes the vapor stream including the nitrogen vapor and the solvent vapor from the oven. The discharged vapor stream is then passed through a solvent recovery means in order to condense the solvent vapor in the vapor stream and separately discharge the nitrogen vapor and liquid solvent. The liquid solvent is typically stored for reuse in the mixture used to coat the film, and the nitrogen vapor is returned to the inert gas nozzles in the oven, thereby effectively recycling both the nitrogen and the solvent. A preferred solvent recovery means is the condensation-type wherein the solvent vapor is cooled below its liquification temprature in a series of heat exchangers which operate at temperatures above the liquification temperature of the nitrogen vapor, so that the nitrogen remains in the vapor phase while the solvent enters the liquid phase, thereby facilitating separation of the two as different phases. Where the condensation-type solvent recovery means utilizes ambient water in a heat-exchange relationship with the vapor stream in order to condense the solvent vapor, the efficacy of the solvent recovery means varies greatly with the temperature of the cooling water. As ambient cooling water may vary in temperature widely, dependent for example upon the season of the year, the capacity of the solvent recovery means also varies considerably.

Accordingly, it is an object of the present invention to provide a solvent recovery system utilizing a flotation-type coating oven and a condensation-type solvent recovery means which does not rely on ambient water for condensing the solvent vapor within the solvent recovery means.

Another object is to provide such a system which is simple, inexpensive and efficient to operate.

SUMMARY OF THE INVENTION

It has now been found that the above and related objects of the present invention are obtained in a solvent recovery system utilizing a flotation-type coating oven means for evaporating solvent from a coating on a film, the oven means including means for supporting the film on a bed of nitrogen vapor and for discharging a vapor stream including the nitrogen vapor and the solvent vapor. Vapor phase molecular sieve means dry the vapor stream from the oven means and discharge a dried vapor stream. Condensation-type solvent recovery means condense the solvent vapor in the dried vapor stream from the vapor phase molecular sieve means and discharge nitrogen vapor and liquid solvent separately. Cryogenic vaporizer means convert liquid nitrogen to nitrogen vapor with heat from a heat exchange fluid in heat exchange relationship with the liquid nitrogen. Means are provided to pass the heat exchange fluid from the vaporizer means through the solvent recovery means in heat exchange relationship with the dried vapor stream therein to cool the same.

Preferably liquid nitrogen is introduced into the solven recovery means in heat exchange relationship with the dried vapor stream to condense the solvent vapor therein, and nitrogen vapor from the vaporizer means is periodically passed through said vapor phase molecular sieve means to periodically dry the vapor phase molecular sieve means.

In a preferred embodiment, liquid phase molecular sieve means are provided to dry a portion of the liquid solvent from the solvent recovery means and discharge (i.e., spray) the dried liquid solvent into the dried vapor stream entering the solvent recovery means to reduce the effective moisture content thereof.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein:

FIG. 1 is a flow chart of a solvent recovery system according to the present invention.

DETAILED DESCRIPTION OF THE PREFERRED EMBODIMENTS

Referring now to the drawing, and in particular to FIG. 1 thereof, the present invention resides in a solvent recovery system, generally designated by the reference numeral 10. In its conventional aspects, the solvent recovery system 10 includes an inert flotation-type dryer oven system 12 (obtained from Teijin-Seiki of Matsuyama City, Japan) and a condensation-type solvent recovery means 14 (such as that available under the tradename ASRS 360 from Airco Industrial Gases of Murray Hill, New Jersey). Liquid nitrogen from a source 16 is vaporized and thereby converted to nitrogen vapor in one or more air-type vaporizers 18 (such as that available from Airco Industrial Gases of Murray Hill, N.J.). The requisite heat to convert the liquid nitrogen to nitrogen vapor in the air-type vaporizer 18 is provided by air passed through the vaporizer 18 in a heat-exchange relationship, as indicated at 20. The output from the solvent recovery means 14 includes liquified solvent (which may include various other condensable gases such as water vapor) which is stored in a "wet" solvent storage tank 22 and nitrogen vapor (which may include various other non-condensable gases) which is returned to the dryer oven 12 to support the coated film.

In its novel aspects, the solvent recovery system 10 of the present invention additionally includes a cryogenic vaporizer 30 (such as that available under the tradename P 100-20-CW from Thermax Inc. of S. Dartmouth, Mass.) and a vapor phase molecular sieve 32 (such as that available under the tradename AVPMS-2500 from Airco Industrial Gases of Murray Hill, New Jersey). In contrast to the air-type vapoizer 18 utilizing the heat of ambient air to vaporize the liquid nitrogen from source 16, the cryogenic vaporizer 30 vaporizes the liquid nitrogen using the heat supplied by a heat exchange fluid 34 in heat exchange relationship at 36 with the liquid nitrogen in the cryogenic vaporizer 30. The heat-exchange fluid 34 (commonly called a "coolant") is conveniently water, although other conventional coolants may be used. The coolant 34 is preferably maintained in a closed circuit 40, including both the heat exchanger 36 in the cryogenic vaporizer 30 and the heat exchanger 42 in the solvent recovery means 14. As liquid nitrogen is typically supplied at a temperature of approximately −300° F., it is easily capable of rapidly cooling the coolant to the desired temperature. For a desired flow rate of coolant 34 through the cryogenic vaporizer 30, the flow rate of the liquid nitrogen into the cryogenic vaporizer 30 may easily be adjusted to provide the desired degree of cooling.

It has been determined that a preferred temperature for coolant entering the solvent recovery means 14 is 25° F., the water being maintained as liquid at this temperature, even though the circuit 40 is under pressure (e.g., 20–80 psi, preferably 60–70 psi) to keep the coolant flowing, by adding antifreeze (e.g., inhibited ethylene glycol such as that available under the tradename Dowtherm SR-1 from Dow Chemical Company) to reduce the freezing point of the coolant to about −20° F. (at 60–70 psi). The use of coolant at a temperature below the freezing point of water (32° F.) will result in increased condensation in the first heat exchanger of the solvent recovery means 14. This in turn will reduce the moisture content entrained in the solvent vapor entering the last heat exchanger, which will reduce the occurrences of icing therein. When icing occurs, especially in the last heat exchanger, it restricts the gas flow in that heat exchanger, which in turn causes air pressure fluctuations and possible solvent entrainment in the nitrogen vapor being recycled from the solvent recovery means 14 to the drying over 12. Such solvent entrainment has been found to be a primary source of pinholes formation in the coating on the magnetic tape during drying in the oven 12. In order to enable precise control of the vapor concentrations in the oven 12 and thereby minimize pinhole formation, the nitrogen vapor introduced into the oven 12 should be as pure and dry as possible (that is, have as low a concentration of solvent, water vapor and the like as possible).

Typically, the solvent recovery means 14 will be comprised of a plurality of counter-current heat exchangers (e.g., four heat exchangers), with the coolant 34 from circuit 40 cooling the first heat exchanger at 42 and liquid nitrogen from the source 16 cooling the last heat exchanger so that the last heat exchanger preferably operated at a temperature of −50° to −100° F. Intermediate coolants (e.g., toluene) may be used in the intermediate heat exchangers of the solvent recovery means 14. The liquid nitrogen is employed in heat exchange relationship with the vapor stream in the last heat exchanger of the solvent recovery means 14, with the heat of the vapor stream vaporizing the nitrogen liquid to nitrogen vapor for subsequent discharge through the gas nozzles of oven 12. Alternatively, liquid nitrogen from source 16 may be directly introduced into the dried vapor stream within solvent recovery means 14 and subsequently separated from the solvent as nitrogen vapor, along with the nitrogen vapor from the vapor stream leaving oven 12.

The vapor phase molecular sieve 32 ameliorates and in most instances eliminates the problem of icing within the solvent recovery means 14 by lowering the moisture content of the vapor stream entering the solvent recovery means 14. The final moisture content of the vapor stream leaving the sieve 32 is preferably less than 200 ppm. If necessary, a two-phase sieve 32 may be used with the first phase lowering the moisture content to, say, 1000 ppm and the second phase reducing it to less than 200 ppm.

In a preferred embodiment of the present invention, the vapor phase molecular sieve 32 consists of two drying beds (not shown), each of which is filled with aluminum silicate (a zeolite available under the tradename Type 564 from W.R. Grace Co.) or other hygroscopic material and has a heater. The vapor stream discharged by the oven 12 passes through one bed at a time, the water vapor in the vapor stream being removed from the vapor stream by the aluminum silicate so that a dry, or at least drier, vapor stream exits the bed. Because the bed eventually becomes saturated with water removed from the vapor stream, the vapor stream entering sieve 32 is alternated between the two beds every several hours. While one bed is on line (that is, receiving the vapor stream from oven 12), the other bed is off-line and being processed to remove moisture therefrom so that it can subsequently replace the on-line bed. Preferably dry nitrogen vapor from the cryogenic vaporizer 30 is heated by the heater and then passed through the off-line bed in order to assist in dlrying of the same. Thus, the cryogenic vaporizer 30 performs dual functions, both cooling the coolant 34 at heat exchanger 36 for use in the solvent recovery means 14 and providing dry nitrogen vapor to assist in drying of the off-line bed of the vapor phase molecular sieve In a preferred embodiment of the present invention, a portion of the "wet"+solvent from the wet solvent storage tank 22 is passed through a liquid phase molecular sieve 50 which, like the vapor phase molecular sieve 32, may consist of one or multiple stages as necessary to achieve the desired lowering of moisture content and may have multiple beds in order to enable one bed to be on-line and the other bed to be off-line at a given moment. A preferred liquid phase molecular sieve 50 is available under the tradename ALPMS-900 from Airco Industrial Gases and optionally uses the same zeolite hygroscopic material as the vapor phase molecular sieve 32. The "dry"+solvent discharged from the liquid phase molecular sieve 50 is optionally stored in a "dry" solvent storage tank 52 and eventually sprayed directly into the dried vapor stream leaving the vapor phase molecular sieve 32 prior to its entry into the solvent recovery means 14. The dry solvent competes with the solvent vapor already in the dried vapor stream for moisture, thereby further reducing the effective moisture content of the dried vapor stream entering the solvent recovery means 14. It has been found that dry solvent sprayed into a vapor stream entering the solvent recovery means 14 has a substantial effect in reducing the effective moisture content of the condensing liquid within the solvent recovery means 14 and thereby alleviating the danger of freeze-up due to icing of the moisture. Approximately equal flow rates of the dry solvent and the vapor stream are preferred, although greater and lesser ratios may be used.

A blower, such as a fixed displacement blower (not shown), is disposed in the circuit consisting of oven 12 and solvent recovery means 14 (typically, although not necessarily, as part of the oven 12) in order to move the vapor stream components through the circuit—for example, moving the vapor stream discharged from the oven 12 (containing the nitrogen vapor and solvent vapor), through the vapor phase molecular sieve 32 into the solvent recovery means 14, and returning the separated nitrogen vapor to the oven 12.

It will be appreciated that the solvent recovery system of the present invention provides the solvent recovery means with a supply of well-cooled coolant at a temperature below that which would be available using ambient water supplies on a regular basis. The lower temperature of the coolent, and hence the lower operating temperature of the first heat exchanger of the solvent recovery means, increases the efficiency of the solvent recovery means and therefore results not only in greater solvent recovery capacity, but also in superior purification of the nitrogen vapor being recycled into the oven. The system is simple, inexpensive, and efficient to operate.

Now that the preferred embodiments of the present invention have been shown and described in detail, various modifications and the improvements thereon will become readily apparent to those skilled in the art. Accordingly, the appended claims are to be construed broadly and in a manner consistent with the spirit and scope of the invention disclosed herein.

I claim:

1. A solvent recovery system comprising:
   (A) flotation-type coating oven means for evaporating solvent from a coating on a film, said oven means including means for supporting the film on a bed of nitrogen vapor and for discharging a vapor stream including the nitrogen vapor and the solvent vapor;
   (B) vapor phase molecular sieve means for drying the vapor stream from said oven means and for discharging a dried vapor stream;
   (C) condensation-type solvent recovery means for condensing the solvent vapor in the dried vapor stream from said vapor phase molecular sieve means and for discharging nitrogen vapor and liquid solvent separately; and
   (D) cryogenic vaporizer means for converting liquid nitrogen to nitrogen vapor with heat from a heat exchange fluid in heat exchange relationship with the liquid nitrogen, including means for passing the heat exchange fluid from said vaporizer means through said solvent recovery means in heat exchange relationship with the dried vapor stream therein to cool the same.

2. The system of Claim 1 additionally including means for introducing liquid nitrogen into said solvent recovery means in heat exchange relationship with the dried vapor stream to condense the solven vapor therein.

3. The system of Claim 1 additionally including means for periodically passing the nitrogen vapor from said vaporizer means through said vapor molecular sieve means to periodically dry said vapor phase molecular sieve means.

4. The system of Claim 2 additionally including means for periodically passing the nitrogen vapor from said vaporizer means through said vapor phase molecular sieve means to periodically dry said vapor phase molecular sieve means.

5. The system of Claim 3 additionally including liquid phase molecular sieve means for drying a portion of the liquid solvent from said solven recovery means and for discharging the dried liquid solvent into the dried vapor stream entering said solvent recovery means to reduce the effective moisture content thereof.

6. The system of Claim 5 additionally including neans for spraying the dried liquid solvent from said liquid phase molecular sieve means into the dried vapor stream entering said solvent recovery means.

7. The system of Claim 2 additionally including liquid phase molecular sieve means for drying a portion of the liquid solvent from said solvent recovery means and for discharging the dried liquid solvent into the dried vapor stream entering said solvent recovery means to reduce the effective moisture content thereof.

8. The systemof Claim 1 additionally including liquid phase molecular sieve means for drying a portion of the liquid solvent from said solvent recovery means and for discharging the dried liquid solvent into the dried vapor stream entering said solvent recovery means to reduce the effective moisture content thereof.

9. The system of Claim 8 additionally including means for spraying the dried liquid solvent from said liquid phase molecular sieve means into the dried vapor stream entering said solvent recovery means.

10. A solvent recovery system comprising:
    (A) flotation-type coating oven means for evaporating solvent from a coating on a film, said oven means including means for supporting the film on a bed of nitrogen vapor and for discharging a vapor stream including the nitrogen vapor and the solvent vapor;
    (B) vapor phase molecular sieve means for drying the vapor stream from said oven means and for discharging a dried vapor stream;
    (C) condensation-type solvent recovery means for condensing the solven tvapor in the dried vapor stream from said vapor phase molecular sieve means and for discharging nitrogen vapor and liquid solvent separately, including means for passing liquid nitrogen in heat exchange relationship with the dried vapor stream to condense the solvent vapor therein;

(D) cryogenic vaporizer means for converting liquid nitrogen to nitrogen vapor with heat from a heat exchange fluid in heat exchange relationship with the liquid nitrogen, including means for passing the heat exchange fluid from said vaporizer means through said solvent recovery means in heat exchange relationship with the dried vapor stream therein to cool the same and means for periodically passing the nitrogen vapor from said vaporizer means through said vapor phase molecular sieve means to periodically dry said vapor phase molecular sieve means; and (E) liquid phase molecular sieve means for drying a portion of the liquid solvent form said solvent recovery means and for spraying the dried liquid solvent into the dried vapor stream entering said solvent recovery means to reduce the effective moisture content thereof.

* * * * *